United States Patent [19]
Harada et al.

[11] Patent Number: 4,461,841
[45] Date of Patent: Jul. 24, 1984

[54] ACID-SOLUBLE GLASS COMPOSITION FOR MAKING FLEXIBLE FIBER OPTIC BUNDLE

[75] Inventors: Yuho Harada, Ohmiya; Shigeo Kuwayama, Odawara, both of Japan

[73] Assignee: Fuji Photo Optical Co., Ltd., Saitama, Japan

[21] Appl. No.: 301,594

[22] Filed: Sep. 14, 1981

[30] Foreign Application Priority Data

Sep. 27, 1980 [JP] Japan .................. 55-134770

[51] Int. Cl.$^3$ ............................................ C03C 13/00
[52] U.S. Cl. ........................................ 501/37; 65/4.2; 65/31; 350/96.24; 350/96.31; 501/77; 501/79; 501/903
[58] Field of Search ............ 501/37, 38, 77, 79, 501/35; 350/96.24, 96.31

[56] References Cited

U.S. PATENT DOCUMENTS

| | | | |
|---|---|---|---|
| 3,004,368 | 10/1961 | Hicks | 65/4.2 |
| 3,413,133 | 11/1968 | Stalego | 501/35 |
| 3,624,816 | 11/1971 | Strack et al. | 65/3 |
| 4,236,930 | 12/1980 | Macedo | 501/37 |
| 4,275,951 | 6/1981 | Beales et al. | 350/96.31 |
| 4,277,270 | 7/1981 | Krohn | 350/96.31 |

FOREIGN PATENT DOCUMENTS 50-9186  4/1975  Japan ................ 350/96.24

OTHER PUBLICATIONS

Balskaya, L. A. et al., "Phase Separation in Low-Alkali Borosilicate Glasses Containing RO and $Al_2O_3$", pp. 107-113, The Structure of Glass, vol. 8-Phase Separation Phenomena in Glasses, Edited by Porai-Koshits, E. A., (1973).

Primary Examiner—Helen M. McCarthy
Attorney, Agent, or Firm—Gerald J. Ferguson, Jr.; Joseph J. Baker

[57] ABSTRACT

An acid-soluble glass used in manufacture of a flexible fiber optic bundle and a process for manufacturing a flexible fiber optic bundle using the glass. The glass has a composition expressed by mol percent comprising more than 15.0% and less than 41.0% of $SiO_2$, more than 29.0% and less than 54.0% of $B_2O_3$, more than 6.0% and less than 23.0% of BaO, and more than 5.0% and less than 19.0% of at least one alkali metal oxide selected from the group consisting of $Na_2O$, $K_2O$ and $Li_2O$, the total amount of $SiO_2$, $B_2O_3$ and BaO being more than 71.0% and less than 80.0%.

4 Claims, No Drawings

ACID-SOLUBLE GLASS COMPOSITION FOR MAKING FLEXIBLE FIBER OPTIC BUNDLE

BACKGROUND OF THE INVENTION

1. Field of the Invention

This invention relates to an acid-soluble glass composition for use in manufacture of a flexible fiber optic bundle and to a process for manufacturing a flexible fiber optic bundle using the same.

2. Description of the Prior Art

A fiber optic bundle is formed of a multiplicity of optical fibers packed in tightly side-by-side bundled relation with each other. When the fiber optic bundle is used as an image-transmitting device, it is essential that the individual optical fibers be arranged in identical geometrical patterns at the opposite ends of the bundle so that each part of an image at the object end of the bundle will be reproduced at the image end thereof in the same location. In particular, when the fiber optic bundle is used as a flexible image-transmitting device such as an endoscope, it is further essential that the optical fibers are bonded to each other only at their opposite ends so that the optical fibers may be flexibly curved between their opposite ends. Various processes for manufacturing such a fiber optic bundle comprising the rigid end portions in which the optical fibers are bonded to each other and the flexible intermediate portion between the rigid end portions have heretofore been proposed.

For example, a process for manufacturing a flexible fiber optic bundle for image transmission comprising the following steps is known in the art;

(i) forming an optical fiber comprising a core of glass of relatively high refractive index and a coating of glass of relatively low refractive index surrounding the core, (ii) winding up the optical fiber in the form of a spiral having no gaps between adjacent convolutions, bonding the adjacent convolutions to each other with an adhesive at a proper portion of the spiral, and repeating the winding up and the bonding in accumulated convolutions to obtain a loop-like bundle of the optical fibers having a desired width and thickness with a rigid portion in which the optical fibers are bonded to each other with the adhesive, (iii) cutting the bundle laterally at the rigid portion, and (iv) polishing the cut end faces of the bundle.

In the step (i), the optical fiber is formed, for example, by using a double-walled crucible having an orifice at the bottom thereof. That is, the glass of relatively high refractive index and the glass of relatively low refractive index are placed in the inner and the outer spaces of the double-walled crucible, respectively, and the crucible is heated to a proper temperature to melt the two kinds of glass. Then, the two kinds of molten glass are drawn downwardly simultaneously through the orifice to form an optical fiber.

In the above-mentioned process, the cross-sectional size of the optical fiber formed in the step (i) is not reduced during the subsequent steps (ii) to (iv) and accordingly, a very thin optical fiber having a diameter of $20\mu$ for example is formed in the step (i) in order to increase the resolution of the image transmitted through the flexible fiber optic bundle. Accordingly, the operation to arrange the optical fibers, that is, the repeated winding up and bonding in the step (ii), demands operator's skill. In addition, there is a fear that the optical fibers are severed while being arranged. Therefore, the above-mentioned process has disadvantages that the reject rate of the flexible fiber optic bundle manufactured by the process is high and the manufacturing cost thereof is also high.

Another process for manufacturing a flexible fiber optic bundle in which acid leaching is utilized is also known in the art. The process comprises steps of;

(i) forming an optical fiber comprising a core of glass of relatively high refractive index, a first coating of acid-resisting glass of relatively low refractive index surrounding the core, and a second coating of acid-soluble glass surrounding the first coating, (ii) bundling a multiplicity of the optical fibers (for example, ten thousand optical fibers) in side-by-side relation with each other to obtain a bundle of the optical fibers, (iii) heating and drawing the bundle to form an elongated rigid bundle of reduced diameter, and (iv) contacting the intermediate portion of the length of the elongated rigid bundle between the opposite end portions thereof with an acid such as nitric acid, and leaching the acid-soluble glass of the second coating from the intermediate portion to make the intermediate portion flexible.

The bundle of the optical fibers obtained after the step (ii) may be placed within a tubular casing of the same acid-soluble glass as that of the second coating. When the bundle of the optical fibers is placed within the tubular casing, the above steps (i) and (ii) are followed by steps of (ii') placing the bundle within the tubular casing, (iii) heating and drawing the bundle and the casing together to form an elongated rigid bundle of reduced diameter having the acid-soluble glass of the casing therearound, and (iv) contacting the intermediate portion of the elongated rigid bundle between the opposite end portions thereof with an acid such as nitric acid, and leaching the acid-soluble glass of the second coating and of the casing from the intermediate portion to make the intermediate portion flexible.

In the above step (i), the optical fiber is formed, for example, by using a triple-walled crucible having an orifice at the bottom thereof. That is, the glass of relatively high refractive index, the acid-resisting glass of relatively low refractive index and the acid-soluble glass (the glass preferably has an coefficient of thermal expansion and viscosity similar to those of the former two glasses) are placed in the innermost, the next to the innermost and the outer spaces of the triple-walled crucible, respectively, and the crucible is heated to proper temperature to melt the three kinds of glass. Then, the three kinds of molten glass is drawn simultaneously through the orifice to form the optical fiber. The optical fiber thus obtained is cut into proper length (for example, about 300 mm) and a multiplicity of the optical fibers of a proper length obtained are bundled in the step (ii).

In the step (iv), the contact of the intermediate portion of the elongated rigid bundle with an acid is performed, for example, by coating the opposite end portions of the elongated rigid bundle with an acid-resisting material and then, immersing the whole elongated rigid bundle in an acid.

Differently from the aforementioned process, in the process utilizing acid leaching, the diameter of the optical fiber formed in the step (i) is reduced in the subsequent step (iii) and accordingly, a relatively thick optical fiber may be formed in the step (i). For example, an optical fiber having a diameter of about 200μ is formed in the step (i) and the optical fiber is elongated in the step (iii) to the extent that the diameter thereof is reduced to about 10μ. Accordingly, the operation of arranging the optical fibers in the step (ii) can be performed easily. Further, the optical fibers are hardly severed during the operation of arranging the optical fibers. Since the optical fibers are integrated when heated in the step (iii), the optical fibers are not severed in the subsequent steps (iii) and (iv) at all. Therefore, the reject rate of the flexible fiber optic bundle manufactured by the process utilizing acid leaching is lower than that of the flexible fiber optic bundle manufactured by the aforementioned process. Further, the manufacturing cost of the flexible fiber optic bundle manufactured by the process utilizing acid leaching is much lower than that of the flexible fiber optic bundle manufactured by the aforementioned process.

However, the process which utilizes acid leaching has the following disadvantage. That is, when the second coating of acid-soluble glass of the optical fiber is leached with an acid, the first coating of acid-resisting glass is also etched by the acid and as the result, the surface of the first coating is roughened. This is because the second coating of acid-soluble glass exists in extremely narrow gaps in the elongated rigid bundle. The resulting roughness of the surface of the first coating causes the severance of the optical fiber and accordingly, shortens the life of the bundle. The above problem can be solved by using an acid-soluble glass having sufficiently high acid-solubility in the second coating.

Such an acid-soluble glass is disclosed in Japanese Patent Publication No. 38623/1978 and U.S. Pat. No. 3,624,816. The acid-soluble glass disclosed in the former has a composition expressed by weight percent comprising about 45% of $B_2O_3$, about 45% of BaO and about 8% of $La_2O_3$ (when the composition is expressed by mol percent, the composition comprises about 65.7% of $B_2O_3$, about 29.8% of BaO and about 2.5% of $La_2O_3$). The acid-soluble glass disclosed in the latter has a composition expressed by weight percent comprising about 47% of $B_2O_3$, about 45% of BaO and about 5% of $La_2O_3$ (when the composition is expressed by mol percent, the composition comprises about 66.6% of $B_2O_3$, about 28.9% of BaO and about 1.5% of $La_2O_3$). However, the water resistance of the acid-soluble glass of the type disclosed in the above patents is extremely low though the acid-solubility thereof is sufficiently high. Accordingly, when the opposite ends of the flexible fiber optic bundle manufactured using the acid-soluble glass are polished, the acid-glass dissolves during the polishing. Because of the dissolution of the acid-soluble glass, it is difficult to polish the opposite ends. Further, since the BaO content of the acid-soluble glass of the type disclosed in the above patents is high, the variation in viscosity of the acid-soluble glass accompanying the variation in temperature is enlarged. Accordingly, it is very difficult to form an optical fiber having extremely high dimentional accuracy by using the acid-soluble glass.

SUMMARY OF THE INVENTION

An object of the present invention is to provide the acid-soluble glass composition used in manufacture of a flexible fiber optic bundle, which does not have the abovementioned defects of the conventional acid-soluble glass composition used therein.

Another object of the present invention is to provide an improved process of the conventional process for manufacturing a flexible fiber optic bundle, in which the acid-soluble glass of the present invention is used.

The acid-soluble glass of the present invention has a composition expressed by mol percent comprising more than 15.0% and less than 41.0% of $SiO_2$, more than 29.0% and less than 54.0% of $B_2O_3$, more than 6.0% and less than 23.0% of BaO, and more than 5.0% and less than 19.0% of at least one alkali metal oxide selected from the group consisting of $Na_2O$, $K_2O$ and $Li_2O$, the total amount of $SiO_2$, $B_2O_3$ and BaO being more than 71.0% and less than 80.0%. ZnO may be contained in the composition in an amount of not more than 12.0%.

The process of the present invention is a process for manufacturing a flexible fiber optic bundle in which acid leaching is utilized as mentioned above characterized in that the above-mentioned glass is used in the second coating of the optical fiber or in the second coating of the optical fiber and the tubular casing.

DETAILED DESCRIPTION OF THE INVENTION

The acid-soluble glass of the present invention comprises $SiO_2$, $B_2O_3$, BaO and at least one alkali metal oxide selected from the group consisting of $Na_2O$, $K_2O$ and $Li_2O$. $SiO_2$ is contained in the glass in an amount of more than 15.0 mol % and less than 41.0 mol %. When the content of $SiO_2$ is not more than 15.0 mol %, the viscosity of the glass at the temperature at which an optical fiber is formed in the step (i) of the above-mentioned flexible fiber optic bundle-manufacturing process utilizing acid leaching becomes too low, and accordingly, it is very difficult to form an optical fiber having extremely high dimensional accuracy. On the other hand, when the content of $SiO_2$ is not less than 41.0 mol %, the glass does not have sufficiently high acid-solubility.

$B_2O_3$ is contained in the glass of the present invention in an amount of more than 29.0 mol % and less than 54.0 mol %. When the content of $B_2O_3$ is not more than 29.0 mol %, the glass does not have sufficiently high acid-solubility. On the other hand, when the content of $B_2O_3$ is not less than 54.0 mol %, the viscosity of the glass at the temperature at which an optical fiber is formed in the step (i) of the above-mentioned flexible fiber optic bundle-manufacturing process utilizing acid leaching becomes too low, and accordingly, it is very difficult to form an optical fiber having extremely high dimensional accuracy.

BaO is contained in the glass of the present invention in an amount of more than 6.0 mol % and less than 23.0 mol %. When the content of BaO is not more than 6.0 mol %, the glass does not have sufficiently high acid-solubility. On the other hand, when the content of BaO is not less than 23.0 mol %, the variation in viscosity of the glass accompanying the variation in temperature is remarkably enlarged.

At least one of $Na_2O$, $K_2O$ and $Li_2O$ is contained in the glass of the present invention in an amount of more than 5.0 mol % and less than 19.0 mol %. When the content of at least one of $Na_2O$, $K_2O$ and $Li_2O$ is not more than 5.0 mol %, the coefficient of thermal expansion of the glass becomes too small. On the other hand, when the content of at least one of $Na_2O$, $K_2O$ and $Li_2O$ is not less than 19.0 mol %, the coefficient of thermal expansion of the glass becomes too large.

In the glass of the present invention, the total amount of $SiO_2$, $B_2O_2$ and BaO must be within the range of more than 71.0 mol % and less than 80.0 mol %. When the total amount of $SiO_2$, $B_2O_3$ and BaO is not more than 71.0 mol %, the glass does not have sufficiently high acid-solubility and water resistance. On the other hand, when the total amount of $SiO_2$, $B_2O_3$ and BaO is not less than 80.0%, the variation in viscosity of the glass accompanying the variation in temperature is remarkably enlarged.

ZnO may be contained in the glass of the present invention. ZnO improves the water resistance of the glass and make the variation in viscosity of the glass accompanying the variation in temperature small. However, if ZnO is contained in the glass, the content of ZnO must be not more than 12.0 mol %. When ZnO is contained in the glass in an amount of more than 12.0 mol %, the glass is apt to be devitrified by ZnO.

Further, $Al_2O_3$ and at least one of MgO, CaO and SrO may be contained in the glass of the present invention in an amount of not more than about 7 mol % and not more than about 5 mol %, respectively. Furthermore, a small amount of colorant and a small amount of fining agent such as $As_2O_3$ and $Sb_2O_3$ may be contained in the glass of the present invention.

Tables 1 and 2 below illustrate several examples of the glass of the present invention. In Tables 1 and 2, the composition of each glass is expressed by both weight percent (W) and mol percent (M). The transformation point represents the temperature at which the viscosity of the glass is $10^{11}$ to $10^{12}$ poises. The flexing point represents the temperature at which the viscosity of the glass is $10^{13}$ poises. The water resistance and the acid resistance were measured by the following method. That is, a glass sample was pulverized into particles having a particle size of 420 to 590μ, washed with methyl alcohol and then, dried to obtain a powder sample. The powder sample of a gram number corresponding to the specific gravity thereof was placed in a leaching cage made of platinum and then, the leaching cage was put into a boiling test solution in a silica glass round flask. Then, the powder sample was treated in the boiling test solution for 60 minutes and dried. After the drying, the weight of the powder sample was measured and the weight loss (%) of the powder sample was calculated. In the case of water resistance measurement, a distilled water having a pH value of 6.5 to 7.5 was used as the test solution, and in the case of acid resistance measurement, a nitric acid having a concentration of 1/100 N (about pH 2.2) was used as the test solution.

TABLE 1

|  | 1 W | 1 M | 2 W | 2 M | 3 W | 3 M | 4 W | 4 M | 5 W | 5 M | 6 W | 6 M | 7 W | 7 M | 8 W | 8 M |
|---|---|---|---|---|---|---|---|---|---|---|---|---|---|---|---|---|
| $Al_2O_3$ | — | — | — | — | — | — | — | — | — | — | — | — | — | — | 2.5 | 2.1 |
| $SiO_2$ | 19.5 | 23.9 | 19.5 | 24.2 | 22.5 | 27.3 | 19.5 | 26.2 | 25.5 | 30.8 | 29.5 | 35.6 | 33.5 | 40.1 | 16.5 | 22.9 |
| $B_2O_3$ | 43.0 | 45.5 | 43.0 | 46.2 | 43.0 | 45.2 | 30.0 | 34.8 | 40.0 | 41.8 | 33.0 | 34.3 | 29.0 | 30.0 | 35.0 | 41.9 |
| $Na_2O$ | 11.0 | 13.0 | 10.0 | 12.0 | 10.0 | 11.8 | 11.0 | 14.3 | 10.0 | 11.7 | 11.0 | 12.8 | 11.0 | 12.7 | — | — |
| $K_2O$ | — | — | — | — | — | — | — | — | — | — | — | — | 11.0 | 9.7 | — | — |
| BaO | 15.0 | 7.2 | 18.0 | 8.8 | 15.0 | 7.2 | 31.0 | 16.3 | 15.0 | 7.1 | 15.0 | 7.1 | 15.0 | 7.1 | 26.0 | 14.1 |
| ZnO | 11.5 | 10.4 | 9.5 | 8.8 | 9.5 | 8.5 | 8.5 | 8.4 | 9.5 | 8.5 | 11.5 | 10.2 | 11.5 | 10.1 | 9.0 | 9.3 |
| CaO | — | — | — | — | — | — | — | — | — | — | — | — | — | — | — | — |
| $Li_2O$ | — | — | — | — | — | — | — | — | — | — | — | — | — | — | — | — |
| $SiO_2 + B_2O_3 + BaO$ |  | 76.6 |  | 79.2 |  | 79.7 |  | 77.3 |  | 79.7 |  | 77.0 |  | 77.1 |  | 78.9 |
| Specific gravity |  | 2.86 |  | 2.93 |  | 2.80 |  | 3.27 |  | 2.82 |  | 2.92 |  | 2.94 |  | 3.17 |
| Refractive index |  | 1.5632 |  | 1.5689 |  | 1.5571 |  | 1.5963 |  | 1.5665 |  | 1.5663 |  | 1.5676 |  | 1.5735 |
| V value |  | 60.3 |  | 60.4 |  | 61.2 |  | 58.7 |  | 61.2 |  | 60.4 |  | 60.3 |  | 59.8 |
| Transformation point |  | 521° C. |  | 528° C. |  | 525° C. |  | 530° C. |  | 527° C. |  | 537° C. |  | 543° C. |  | 530° C. |
| Flexing point |  | 550° C. |  | 555° C. |  | 560° C. |  | 560° C. |  | 562° C. |  | 565° C. |  | 565° C. |  | 570° C. |
| Coefficient of thermal expansion ($\times 10^{-7}$ cm/cm° C.) |  | 97 |  | 92 |  | 78 |  | 88 |  | 78 |  | 97 |  | 97 |  | 95 |
| Water resistance (weight loss %) |  | 1.63 |  | 1.06 |  | 1.38 |  | 0.40 |  | 1.06 |  | 0.40 |  | 0.30 |  | 0.68 |
| Acid resistance (weight loss %) |  | 2.88 |  | 2.69 |  | 2.71 |  | 1.60 |  | 2.41 |  | 1.79 |  | 1.30 |  | 1.57 | in the glass of the present invention.

TABLE 2

|  | 9 W | 9 M | 10 W | 10 M | 11 W | 11 M | 12 W | 12 M | 13 W | 13 M | 14 W | 14 M | 15 W | 15 M | 16 W | 16 M |
|---|---|---|---|---|---|---|---|---|---|---|---|---|---|---|---|---|
| $Al_2O_3$ | 2.5 | 2.0 | 2.5 | 2.0 | — | — | 6.5 | 5.3 | — | — | 2.5 | 2.0 | — | — | — | — |
| $SiO_2$ | 13.5 | 18.1 | 16.5 | 21.5 | 19.5 | 24.4 | 13.5 | 18.7 | 19.5 | 25.4 | 16.5 | 22.1 | 19.5 | 24.1 | 19.5 | 24.5 |
| $B_2O_3$ | 35.0 | 40.4 | 35.0 | 39.4 | 41.5 | 44.9 | 34.0 | 40.5 | 35.0 | 39.4 | 35.0 | 40.5 | 44.0 | 46.9 | 40.5 | 44.1 |
| $Na_2O$ | 11.0 | 14.2 | 10.0 | 12.6 | 11.0 | 13.3 | 10.0 | 13.3 | 11.0 | 13.9 | 11.0 | 14.2 | 11.0 | 13.1 | 11.0 | 13.4 |
| $K_2O$ | — | — | — | — | — | — | — | — | — | — | — | — | — | — | — | — |
| BaO | 26.0 | 13.5 | 26.0 | 13.2 | 19.5 | 9.6 | 33.0 | 17.8 | 26.0 | 13.2 | 29.0 | 15.2 | 17.0 | 8.2 | 20.5 | 10.1 |
| ZnO | 12.0 | 11.8 | 9.0 | 8.7 | 8.5 | 7.8 | — | — | 8.5 | 8.1 | 6.0 | 6.0 | 8.5 | 7.7 | 8.5 | 7.9 |
| CaO | — | — | — | — | — | — | 3.0 | 4.4 | — | — | — | — | — | — | — | — |
| $Li_2O$ | — | — | 1.0 | 2.6 | — | — | — | — | — | — | — | — | — | — | — | — |
| $SiO_2 + B_2O_3 + BaO$ |  | 72.0 |  | 74.1 |  | 78.9 |  | 77.0 |  | 78.0 |  | 77.8 |  | 79.2 |  | 78.7 |
| Specific gravity |  | 3.15 |  | 3.10 |  | 2.92 |  | 3.11 |  | 3.12 |  | 3.13 |  | 2.85 |  | 2.95 |
| Refractive index |  | 1.5851 |  | 1.5840 |  | 1.5669 |  | 1.5848 |  | 1.5825 |  | 1.5823 |  | 1.5610 |  | 1.5696 |
| V value |  | 57.4 |  | 59.0 |  | 62.6 |  | 60.0 |  | 69.5 |  | 59.7 |  | 61.2 |  | 60.7 |
| Transformation point |  | 505° C. |  | 490° C. |  | 523° C. |  | 518° C. |  | 530° C. |  | 523° C. |  | 521° C. |  | 525° C. |
| Flexing point |  | 536° C. |  | 530° C. |  | 557° C. |  | 554° C. |  | 562° C. |  | 556° C. |  | 558° C. |  | 558° C. |
| Coefficient of thermal expansion |  | 95 |  | 95 |  | 89 |  | 100 |  | 88 |  | 96 |  | 85 |  | 88 |

TABLE 2-continued

| | 9 | | 10 | | 11 | | 12 | | 13 | | 14 | | 15 | | 16 | |
|---|---|---|---|---|---|---|---|---|---|---|---|---|---|---|---|---|
| | W | M | W | M | W | M | W | M | W | M | W | M | W | M | W | M |
| ($\times 10^{-7}$cm/cm° C.) Water resistance (weight loss %) | 0.93 | | 0.80 | | 1.05 | | 0.88 | | 0.40 | | 1.04 | | 1.58 | | 0.91 | |
| Acid resistance (weight loss %) | 1.46 | | 1.60 | | 2.06 | | 1.69 | | 1.68 | | 1.61 | | 2.57 | | 1.95 | |

We claim:

1. An acid-soluble glass for use in manufacture of a flexible fiber optic bundle having a composition expressed by mol percent consisting essentially of more than 15.0% and less than 41.0% of $SiO_2$, more than 29.0% and less than 54.0% of $B_2O_3$, more than 6.0% and less than 23.0% of BaO, and more than 5.0% and less than 19.0% of at least one alkali metal oxide selected from the group consisting of $Na_2O$, $K_2O$ and $Li_2O$, the total amount of said $SiO_2$, $B_2O_3$ and BaO being more than 71.0% and less than 80.0%, and further comprising at least one component selected from the group consisting of not more than 12.0% ZnO, not more than 7.0% $Al_2O_3$, and not more than 5.0% of at least one of MgO, CaO and SrO.

2. The acid-soluble glass of claim 1, further comprising a small amount of colorant.

3. The acid-soluble glass of claim 1, further comprising a small amount of fining agent.

4. The acid-soluble glass of claim 3, wherein said fining agent is $As_2O_3$ or $Sb_2O_3$.

* * * * *